(12) United States Patent
Itoh et al.

(10) Patent No.: US 6,504,810 B2
(45) Date of Patent: Jan. 7, 2003

(54) OPTICAL INFORMATION RECORDING/REPRODUCING SYSTEM

(75) Inventors: Yoshihisa Itoh, Tsurugashima (JP); Hajime Matsushita, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/749,625

(22) Filed: Dec. 28, 2000

(65) Prior Publication Data

US 2001/0017836 A1 Aug. 30, 2001

(30) Foreign Application Priority Data

Dec. 28, 1999 (JP) .......................................... 11-373044

(51) Int. Cl.$^7$ ................................................ G11B 7/00
(52) U.S. Cl. ................ 369/103; 369/112.15; 369/112.1
(58) Field of Search ........................... 369/44.11, 44.12, 369/44.23, 100, 103, 109.01, 112.01, 112.02, 112.1, 112.15

(56) References Cited

U.S. PATENT DOCUMENTS 5,844,700 A * 12/1998 Jaganathan et al. ...... 369/103 X
6,049,401 A * 4/2000 Tanaka et al. .................. 359/3
6,181,665 B1 * 1/2001 Roh ............................ 369/103

\* cited by examiner

Primary Examiner—Muhammad Edun
(74) Attorney, Agent, or Firm—Sughrue Mion, PLLC (57) ABSTRACT

An optical information recording/reproducing system includes a support member for removably supporting a volume holographic memory formed of a photorefractive crystal, and has a shape of a rotary member having a rotational symmetry axis, with plane surfaces perpendicular to the rotational symmetry axis formed at respective opposite ends thereof. The system also includes a reference beam-irradiating member for irradiating the volume holographic memory with a coherent reference beam having a first wavelength. The system also includes a signal beam-irradiating member for irradiating the volume holographic memory with a coherent signal beam which has the first wavelength and is modulated according to image data, to cause the signal beam to intersect with the reference beam within the volume holographic memory and thereby generate a refractive index grating of a three-dimensional optical interference pattern between the signal beam and the reference beam. The system also includes a member for detecting a diffracted light generated by irradiation of the reference beam on the refractive index grating of the optical interference pattern. The support member holds the volume holographic memory in a position allowing the signal beam to pass through the plane surfaces of the volume holographic memory at the respective opposite ends thereof.

21 Claims, 6 Drawing Sheets

OPTICAL INFORMATION RECORDING/ REPRODUCING SYSTEM

BACKGROUND OF THE INVENTION

1. Field of the Invention

This invention relates to a volume holographic memory and an optical information-recording/reproducing system using the volume holographic memory.

2. Description of the Related Art

Conventionally, a holographic memory system is known as a digital recording system utilizing principles of holography. The holographic memory system records and reproduces digital data in and from a memory medium formed of a photorefractive crystal such as lithium niobate ($LiNbO_3$). The photorefractive effect utilized in the medium is a phenomenon in which electric charges generated by optical pumping move within the crystal to form a spatial electric field distribution, and the space charge distribution changes the refractive indexes of the crystal via a linear electro-optical effect, i.e. the Pockels effect. For example, in a ferroelectric crystal having the photorefractive properties, changed refractive indexes are caused in response even to a fine optical input pattern generally having 1000 lines or more per millimeter therein. Further, the photorefractive effect is generated in real time at a response speed on the order of microseconds to seconds in dependence on the material. Therefore, research has been carried out in various applications of the photorefractive crystal as a real-time holographic medium which does not require development of images. In the holographic memory system, it is possible not only to record and reproduce data in units of two-dimensional planar image pages but also to perform multiplexed recording by using a plurality of pages. A volume holographic memory enables three-dimensional recording by three-dimensionally using the above memory medium by transforming the same to a three-dimensional shape, such as a rectangular parallelepiped. In the volume holographic memory which is one type of Fourier transform hologram, two-dimensional image data is recorded page by page in a dispersed manner in the three-dimensional space of this recording medium. In the following, an outline of the volume holographic memory system will be described with reference to FIGS. 1A and 1B.

Figure 1A:
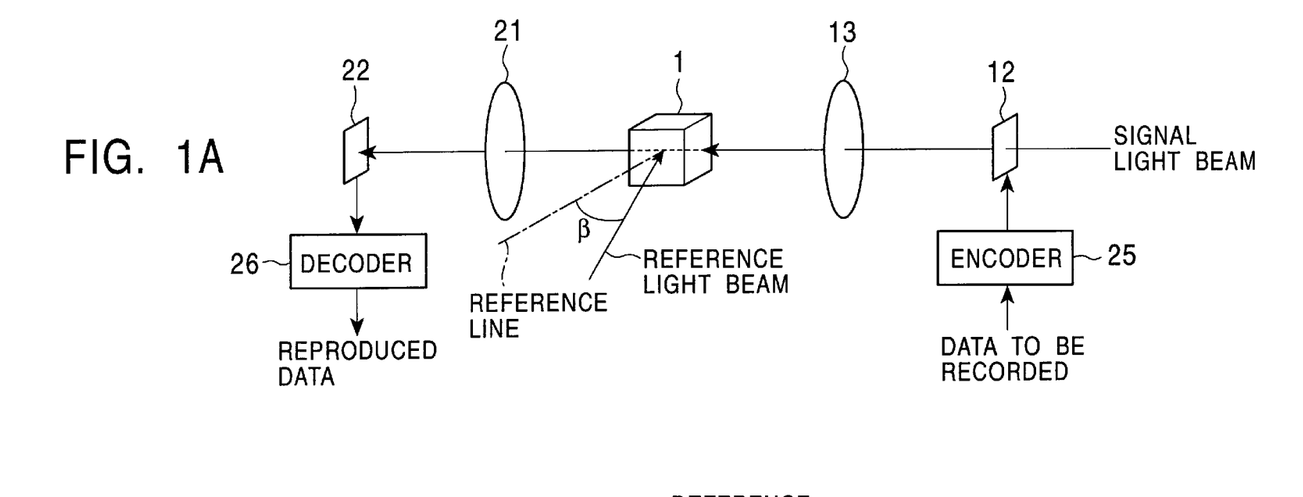
FIGS. 1A and 1B are diagrams schematically showing the arrangement of a conventional volume holographic memory system.

Referring first to FIG. 1A, an encoder 25 converts digital data to be recorded in a volume holographic memory 1 to a dot pattern image of light and dark on a plane, thereby arranging the data into a data array, for example, of 640 bits wide by 480 bits high to generate a unit page data sequence. This data sequence is sent to an SLM (Spatial Light Modulator) 12, implemented, for example, by a panel of a transmission TFT (Thin Film Transistor) liquid crystal display (hereinafter referred to as "LCD").

The SLM 12 has modulating units of 640 pixels wide by 480 pixels high which correspond to a unit page. The SLM 12 modulates a light beam applied thereto to a signal beam having spatial optical ON/OFF signals in response to the unit page data sequence supplied from the encoder 25, and guides the modulated signal beam to a lens 13. More specifically, the SLM 12 allows the signal beam to pass therethrough where bits of the unit page data sequence which is an electric signal have a logical value "1", and blocks the signal beam when bits of the unit page data sequence have a logical value "0", whereby electro-optical conversion is achieved in response to each bit of unit page data, and a modulated signal beam indicative of the unit page data sequence is generated.

The signal beam enters the volume holographic memory 1 via a lens 13. The volume holographic memory 1 receives not only the signal beam, but also a reference light beam or reference beam incident thereon at an angle β (hereinafter referred to as "the incidence angle β") with respect to a predetermined reference line orthogonal to the optical axis of the signal beam.

Figure 1B:
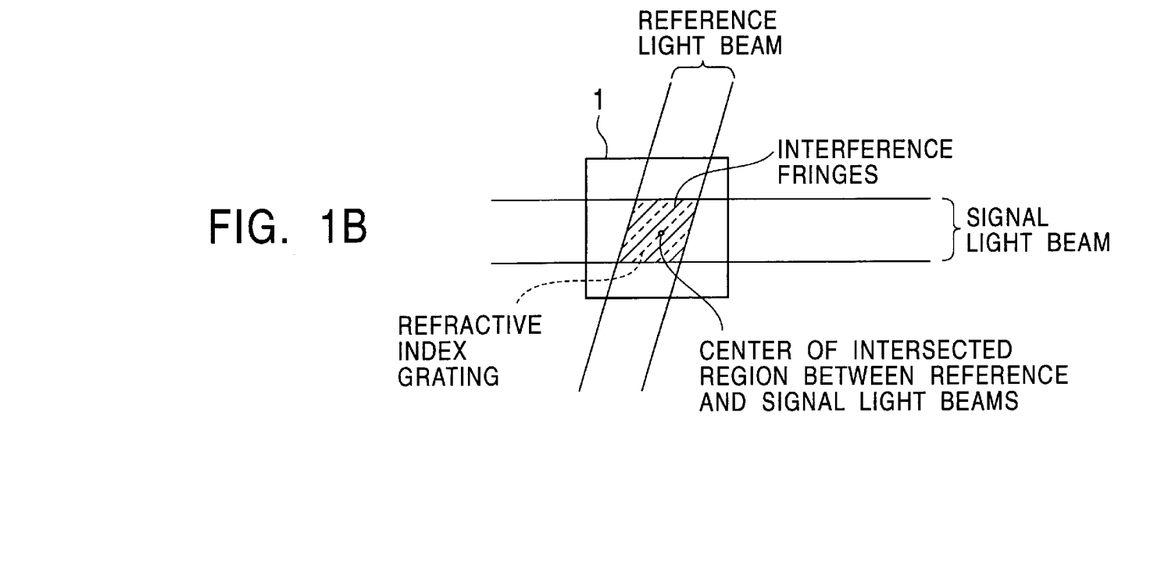

The signal beam and the reference beam interfere with each other within the volume holographic memory 1 as illustrated in FIG. 1B, and resultant interference fringes are stored as a refractive index grating in the volume holographic memory 1, whereby data recording is performed. Further, it is possible to apply the reference beam to the volume holographic memory 1 at different incidence angles β for angle-multiplexed recording of a plurality of two-dimensional plane data items, whereby three-dimensional data recording can be achieved.

When recorded data is reproduced from the volume holographic memory 1, only the reference beam is applied to the volume holographic memory 1 at the same incidence angle β as was set for recording the data, in a manner directed toward the center of an area in which the signal beam and the reference beam intersected with each other in recording the data. That is, differently from the case for recording, the signal beam is not applied to the volume holographic memory 1. Then, a diffracted light from the interference fringes recorded in the volume holographic memory 1 is guided to a CCD (Charge Coupled Device) 22 of the optical detector through a lens 21. The CCD 22 converts the light and shade of the incoming beam to electric signal pulses and supplies an analog electric signal having a level dependent on the luminance of the incoming beam to a decoder 26. The decoder 26 compares the analog signal with a predetermined amplitude value (slice level) and reproduces corresponding data represented by logical values "1" and "0".

In the volume holographic memory, recording is performed in response to a two-dimensional plane data sequence as described above, so that it is possible to carry out angle-multiplexed recording by changing the incidence angle β of the reference beam. More specifically, application of the reference beam to the volume holographic memory 1 at various incidence angles β makes it possible to define a plurality of two-dimensional planes each serving as a recording unit within the volume holographic memory 1, thereby enabling three-dimensional recording. The technique of angle-multiplexed recording is disclosed in Japanese Unexamined Patent Publication Nos. Hei 2-142979 and Hei 10-97174.

OBJECT AND SUMMARY OF THE INVENTION

It is an object of the present invention to provide an optical information recording/reproducing system which is capable of recording an interference pattern in a volume holographic memory at high density and permits downsizing of the system.

To attain the above object, the present invention provides an optical information recording/reproducing system comprising:

support means for removably supporting a volume holographic memory that is formed of a photorefractive crystal, and has a shape of a rotary member having a rotational symmetry axis, with plane surfaces perpendicular to the rotational symmetry axis formed at respective opposite ends thereof;

reference beam-irradiating means for irradiating the volume holographic memory with a coherent reference beam having a first wavelength;

signal beam-irradiating means for irradiating the volume holographic memory with a coherent signal beam which has the first wavelength and is modulated according to image data, to cause the signal beam to intersect with the reference beam within the volume holographic memory, thereby generating a refractive index grating of a three-dimensional optical interference pattern between the signal beam and the reference beam; and means for detecting a diffracted light generated by irradiation of the reference beam on the refractive index grating of the optical interference pattern, wherein the support means holds the volume holographic memory in a position allowing the signal beam to pass through the plane surfaces of the volume holographic memory at the respective opposite ends thereof.

In one aspect of the optical information recording/reproducing system according to the present invention, said support means holds said volume holographic memory in a position where said rotational symmetry axis of said volume holographic memory is parallel with an optical path of said signal beam.

In another aspect of the optical information recording/reproducing system according to the present invention, said reference beam-irradiating means irradiates said reference beam on a side surface of said volume holographic memory.

In a further aspect of the optical information recording/reproducing system according to the present invention, said support means includes means for shifting said volume holographic memory along said rotational symmetry axis of said volume holographic memory.

In a still further aspect of the optical information recording/reproducing system according to the present invention, said support means includes means for rotating said volume holographic memory about said rotational symmetry axis of said volume holographic memory.

In one aspect of the optical information recording/reproducing system according to the present invention, said support means includes means for shifting said volume holographic memory along said rotational symmetry axis of said volume holographic memory, and rotating said volume holographic memory about said rotational symmetry axis.

In another aspect of the optical information recording/reproducing system according to the present invention, the system further comprises gating beam-irradiating means for irradiating said volume holographic memory with a gating beam having a second wavelength for increasing photosensitivity of said volume holographic memory and activating or deactivating said refractive index grating depending on whether said optical interference pattern is present or absent.

In a further aspect of the optical information recording/reproducing system according to the present invention, said gating beam-irradiating means irradiates said gating beam on a side surface of said volume holographic memory.

In a still further aspect of the optical information recording/reproducing system according to the present invention, said gating beam-irradiating means applies said gating beam in a manner restricted to a limited area within said volume holographic memory, where said signal beam and said reference beam intersect with each other.

In another aspect of the optical information recording/reproducing system according to the present invention, the system further comprises a compensation lens having a curved surface complementary to said side surface of said volume holographic memory via which said reference beam and said gating beam enter said volume holographic memory and a plane surface on a side thereof opposite to said curved surface, said compensation lens being arranged such that said complementary curved surface is spaced from said side surface of said volume holographic memory by a predetermined distance.

A volume holographic memory according to the present invention is formed of a photorefractive crystal that records a three-dimensional distribution of interference fringes generated by interference between a reference beam and a signal beam modulated according to image data, the volume holographic memory that is formed of a uniaxial crystal having a shape of a rotary member, and a rotational symmetry axis in parallel with an optical crystal axis of said uniaxial crystal, with plane surfaces perpendicular to said rotational symmetry axis formed at respective opposite ends thereof.

In one aspect of the volume holographic memory according to the present invention, said shape of a rotary member is a shape of a cylinder.

In another aspect of the volume holographic memory according to the present invention, said shape of a rotary member is a shape of a truncated cone.

An additional aspect of the invention provides an optical information recording system which comprises:

support means for removably supporting a volume holographic memory that is formed of a photorefractive crystal, and has a shape of a rotary member having a rotational symmetry axis, with plane surfaces perpendicular to said rotational symmetry axis formed at respective opposite ends thereof;

reference beam-irradiating means for irradiating said volume holographic memory with a coherent reference beam having a first wavelength; and signal beam-irradiating means for irradiating said volume holographic memory with a coherent signal beam which has said first wavelength and is modulated according to image data, to cause said signal beam to intersect with said reference beam within said volume holographic memory and thereby generate a refractive index grating of a three-dimensional optical interference pattern between said signal beam and said reference beam;

wherein said support means holds said volume holographic memory in a position allowing said signal beam to pass through said plane surfaces of said volume holographic memory at said respective opposite ends thereof.

DETAILED DESCRIPTION OF THE PREFERRED EMBODIMENTS

Figure 2:
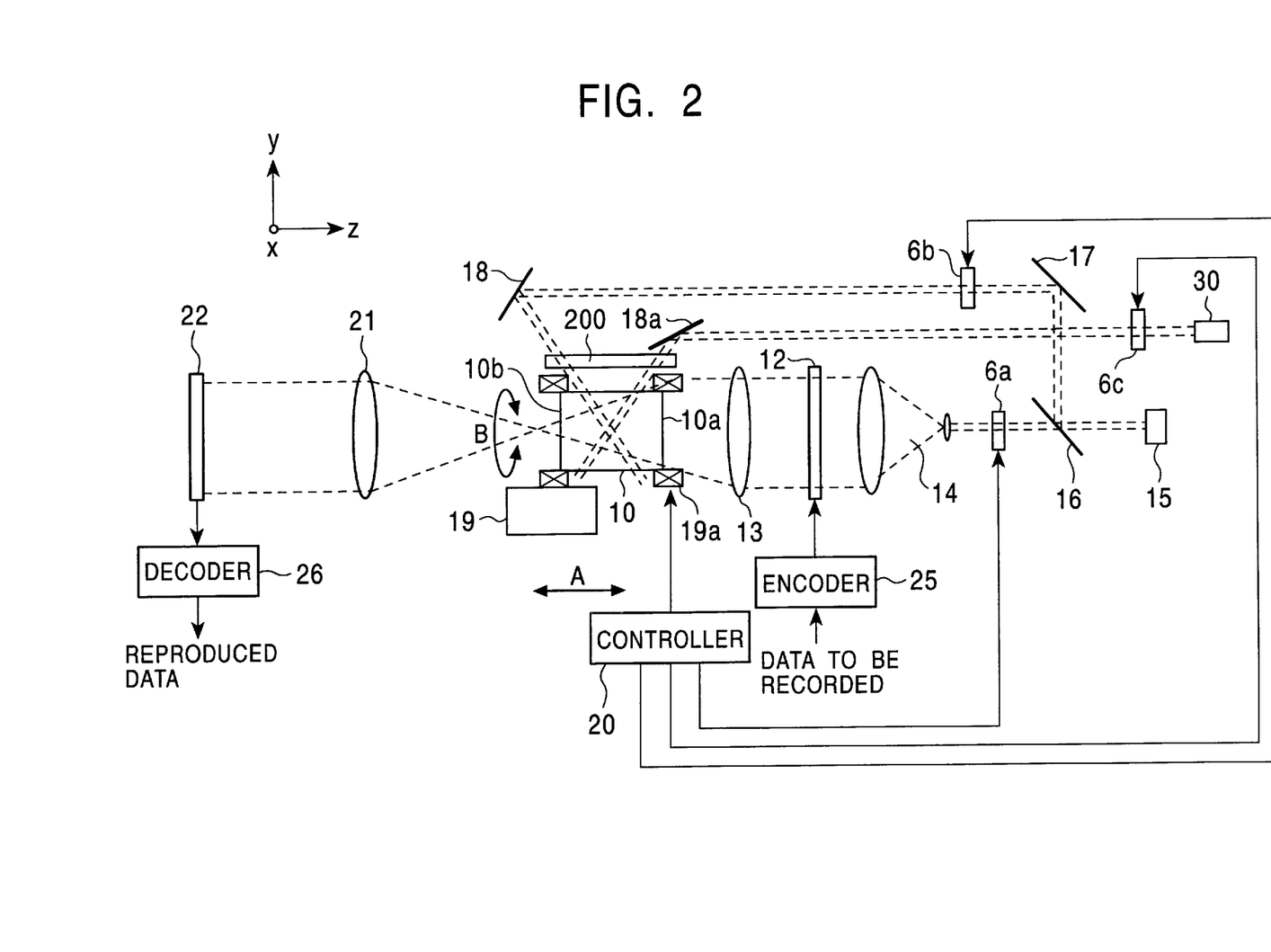
FIG. 2 is a side view schematically showing the arrangement of a volume holographic memory system according to an embodiment of the present invention.

The present invention will now be described in detail with reference to drawings showing an embodiment thereof. Referring first to FIG. 2, there is shown the arrangement of an optical information recording/reproducing system using a volume holographic memory, according to an embodiment of the invention.

In recording of optical information, a signal beam having a first wavelength and emitted from a laser 15 which serves as a light beam source is split by a beam splitter 16 into a signal beam traveling in a straight line and a reference beam deflected upward. The two light beams are guided into an optical path of a signal beam optical system and an optical path of a reference beam optical system, respectively.

In the signal beam optical system, the signal beam which has passed through the beam splitter 16 travels through an automatic shutter 6a controlled by a controller 20, a light beam expander 14, a spatial light modulator 12, and a Fourier transform lens 13, and then is applied to the volume holographic memory 10. More specifically, the shutter 6a controls irradiation time over which the signal beam is applied to the volume holographic memory 10, and the beam expander 14 expands the signal beam into a parallel beam of light having a predetermined diameter. The spatial light modulator 12 is formed, for example, by a two-dimensional LCD having a size of 640 pixels wide by 480 pixels high and displays an image in response to digital image data supplied from an encoder 25. The signal beam is spatially modulated by a two-dimensional grating pattern, which is similar, for example, to a checkered pattern, i.e. by transparent and opaque pixels of an image displayed by the spatial light modulator 12 according to data. The spatially modulated data is then subjected to Fourier transform by the Fourier transform lens 13 to be converged into the volume holographic memory 10, whereby the signal beam passes through the opposite end plane surfaces 10a, 10b of the volume holographic memory 10 in a manner parallel with the rotational symmetry axis of the same.

The volume holographic memory 10 has a cylindrical body which is formed of a uniaxial crystal of a photorefractive crystal, such as lithium niobate ($LiNbO_3$), and has a shape of a rotary member having a rotational symmetry axis parallel to the optical crystal axis of the uniaxial crystal. The volume holographic memory 10 has its opposite ends formed as the plane surfaces 10a, 10b perpendicular to the rotational symmetry axis thereof.

The optical information recording/reproducing system has support means 19 including means for shifting the volume holographic memory 10 along its rotational symmetry axis as well as for rotating the same about the rotational symmetry axis. The volume holographic memory 10 is held by the support means 19, especially by a hollow cylindrical rotary member 19a which is a holder. The hollow cylindrical rotary member 19a is comprised of a pair of separate portions which sandwich the volume holographic memory 10 therebetween to thereby support the same (see FIG. 4). Accordingly, the signal beam passes through the cylindrical rotary member 19a and the opposite end plane surfaces 10a and 10b of the volume holographic memory 10. The cylindrical volume holographic memory 10 is disposed such that the lens 13 provides a Fourier surface perpendicular to the rotational symmetry axis of the memory 10. The rotational symmetry axis of the volume holographic memory 10 (parallel with the optical crystal axis) coincides with the rotational axis of the rotary member 19a, so that the signal beam passes through the opposite plane surfaces 10a and 10b of the volume holographic memory 10 via the hollow portion of the cylindrical rotary member 19a.

On the other hand, in the reference beam optical system arranged at a location upward of the side surface of the volume holographic memory 10, the reference beam is reflected by a mirror 17 and then by a mirror 18 to be applied to the volume holographic memory 10 through a compensation lens 200. Within the volume holographic memory 10, the reference beam is caused to intersect the signal beam applied to the memory 10 via the lens 13 to interfere with the same, whereby three-dimensional interference fringes are formed. A shutter 6b under the control of the controller 20 controls irradiation time over which the reference beam irradiates the volume holographic memory 10.

Further, arranged at another location upward of the side surface of the volume holographic memory 10 is a gating beam-irradiating device including a source 30 for a gating beam, such as a super-luminescent diode, an ultraviolet lamp, or the like, which generates a gating light beam or gating light beam for the volume holographic memory 10. The gating beam contains a principal component which has a second wavelength different from those of the reference beam and the signal beam, for increasing photosensitivity of the volume holographic memory 10. The gating beam activates or deactivates a refractive index grating depending on existence or non-existence of an optical interference pattern within the volume holographic memory 10. Thus, the gating beam also serves as an erasing beam for a refractive index grating generated by an optical interference pattern.

The gating beam-irradiating device is arranged such that it can cause the gating beam to enter the volume holographic memory 10 from the side surface thereof via the compensation lens 200. A shutter 6c under the control of the controller 20 controls irradiation time over which the gating beam irradiates the volume holographic memory 10. The gating beam emitted from the gating beam source 30 is reflected by a mirror 18a such that it is applied in a restricted manner to a limited area in the volume holographic memory 10 where the signal beam and the reference beam intersect with each other, i.e. to a limited portion for recording.

Figure 3:
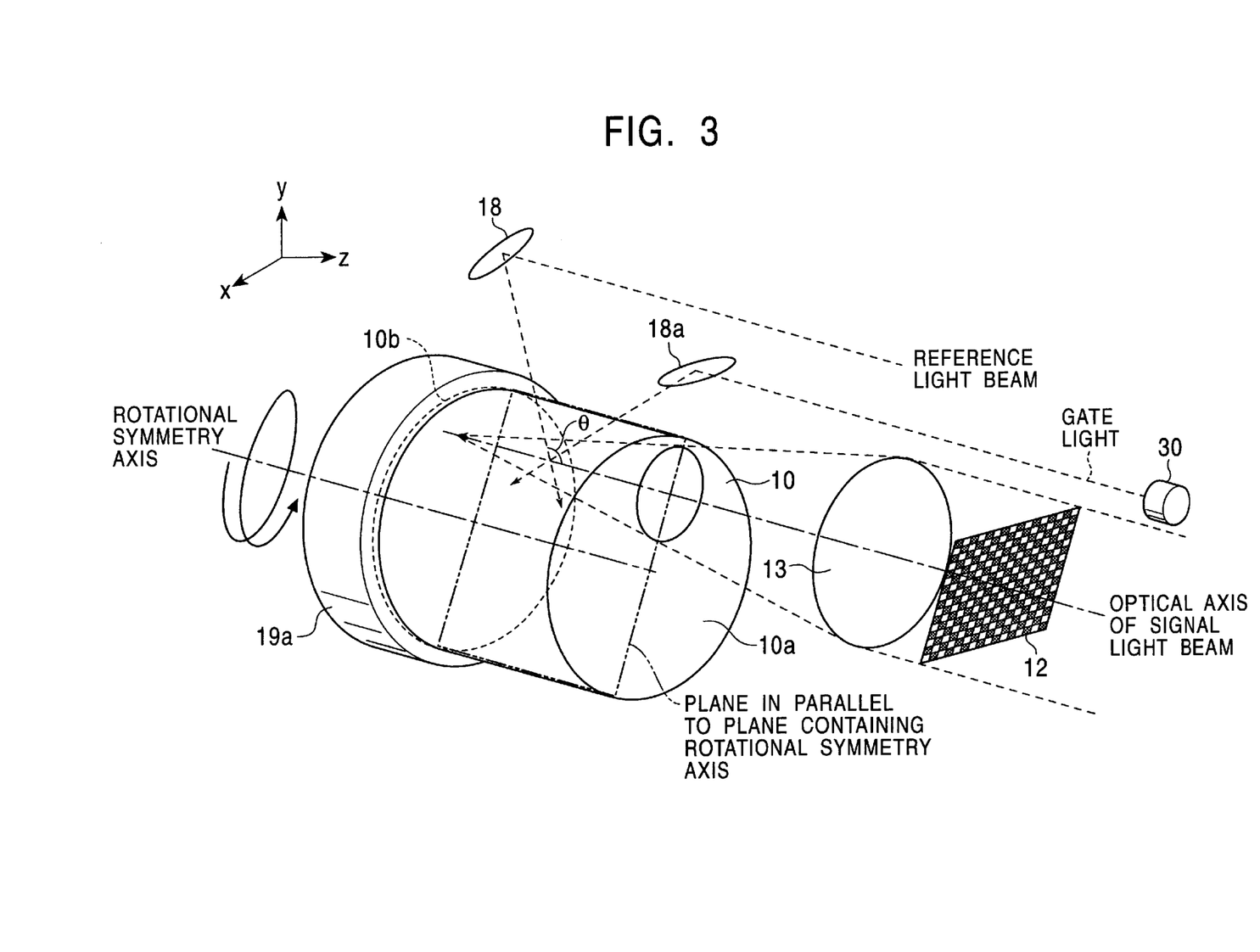
FIG. 3 is a perspective view schematically showing essential parts of the volume holographic memory system of FIG. 2.

As shown in FIG. 3, the optical axis of the signal beam extends in parallel with the rotational symmetry axis of the volume holographic memory 10 and intersects with the optical axis of the reference beam at an angle θ. That is, in the volume holographic memory 10, the optical axes of the signal beam and the reference beam extend on a plane containing the rotational symmetry axis of the volume holographic memory 10. The optical axis of the gating beam also extends on the plane containing the optical axes of the signal beam and the reference beam and the rotational symmetry axis of the volume holographic memory 10. Alternatively, the optical axis of the signal beam may be positioned not on a plane containing the rotational symmetry axis of the cylindrical volume holographic memory, but on a plane parallel to the rotational symmetry axis of the same. Further, the optical axes of the reference beam and the gating beam are not necessarily required to extend on a plane on which optical axis of the signal beam exits so long as the optical axes of the reference beam and the gating beam intersect with the optical axis of the signal beam. Further, it is possible to position the optical axis of the signal beam not in parallel with the rotational symmetry axis of the volume holographic memory 10, but in a manner tilted with respect to the same. In this case, however, a problem, such as astigmatism, can occur.

Thus, in recording of data, the signal beam, the reference beam, and the gating beam are irradiated simultaneously on a predetermined spot inside the volume holographic memory 10, and resulting interference fringes are recorded as a refractive index grating of changed refractive indexes. A time period for forming a hologram is controlled by the automatic shutter 6a of a laser beam source. In forming a hologram, the Fourier surface is not positioned within the volume holographic memory 10, and the optical systems including the mirror 18, the lens 13, and so forth are arranged such that the reference beam and the signal beam interfere with each other not on the Fourier surface, but at a location upstream (or downstream) of the same, and further the memory 10 is moved.

When the Fourier surface on which the intensity of the signal beam is at the maximum exists within a volume holographic memory, interference between a 0-order light of the highly intense signal beam and the reference beam on the Fourier surface causes saturation of the photorefractive effect, and as a result, nonlinear distortion of a recorded image is liable to occur. To avoid this problem, the optical systems of the optical information recording/reproducing system are arranged such that intersection and resultant interference between the reference beam and the signal beam within the memory 10 is caused at a location upstream or downstream of the Fourier surface.

Figure 4:
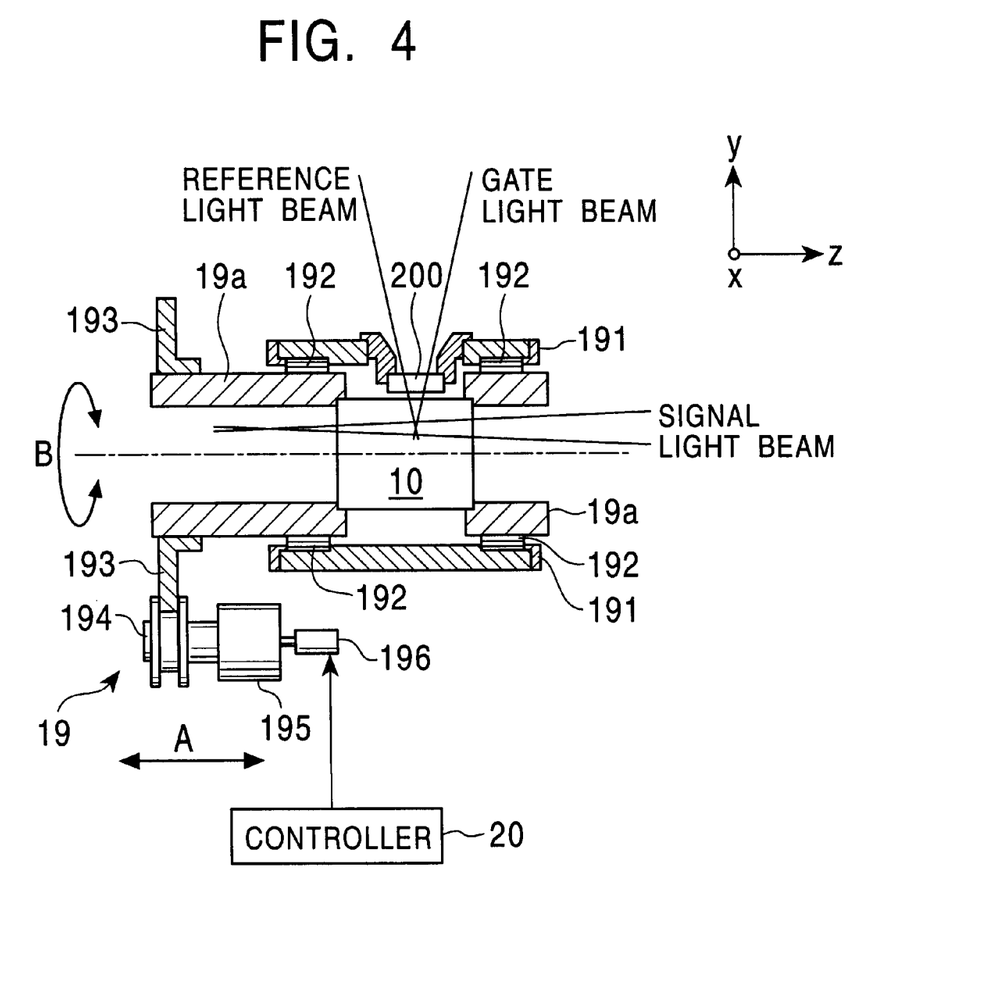
FIG. 4 is a side view schematically showing essential parts of a volume holographic memory support mechanism of the volume holographic memory system of FIG. 2.

The volume holographic memory 10 held by the hollow cylindrical rotary member 19a is shifted along the optical crystal axis thereof (i.e. along the optical axis of the signal beam) by a predetermined pitch and further rotated about the rotational symmetry axis thereof by a predetermined pitch. As shown in FIG. 4, the hollow cylindrical rotary member 19a is mounted on a base 191 via a pair of rotary sliding members 192, such as rollers, such that the rotary member 19a can slide along the optical axis of the signal beam and rotate in unison with the memory 10. A driven gear 193 is rigidly fitted on one end portion of the hollow cylindrical rotary member 19a and in constant mesh with a driving gear 194 arranged under the driven gear 193. The driving gear 194 is connected to a screw feed mechanism 195 which is driven by a stepping motor 196. The stepping motor 196 is controlled by the controller 20. The hollow cylindrical rotary member 19a is rotated or moved along the optical axis of the signal beam by the support means 19 comprised of the mechanisms described above.

As shown in FIG. 4, the screw feed mechanism 195 drives a driving force-transmitting member formed by the driven gear 193 and the driving gear 194 to move the rotary member 19a and the volume holographic memory 10 in directions indicated by a double-headed arrow "A", and at the same time cause the volume holographic memory 10 to rotate by rotation of the driven gear 193 in directions indicated by a double-headed arrow "B". When the volume holographic memory 10 moves in the directions indicated by the arrow "A", a recording spot or location where recorded interference fringes are formed by interference between the reference beam and the signal beam within the volume holographic memory 10 is shifted in the same directions, whereby spatial multiplexed recording can be performed. Further, rotation of the volume holographic memory 10 in unison with the rotary member 19a in the directions indicated by the arrow "B" causes rotation of a recording surface of the interference fringes, whereby angle-multiplexed recording and spatial multiplexed recording can be performed.

In place of the above mechanism for moving the volume holographic memory 10 along the optical axis of the signal beam and rotating the same, it is possible to employ a shift mechanism in which the shift of the volume holographic memory 10 along the optical crystal axis thereof and rotation of the same about the same axis are separately controlled. In this case, the shift mechanism may be constructed, for example, such that the rotation is controlled by an ultrasonic motor or the like, while the movement along the optical crystal axis is controlled by a uniaxial shift stage separate from the motor or the like. Further, it is possible to cause rotation and linear motion of the volume holographic memory 10 in a synchronous manner to thereby complete recording along the rotational symmetry axis of the volume holographic memory 10 and then relatively shift the entry position of the signal beam incident on the volume holographic memory 10 in a radial direction for a subsequent recording. Thus, the recording can be sequentially carried out at radially-outer circumferential areas, radially-intermediate circumferential areas, and radially-inner circumferential areas of the volume holographic memory 10 in a concentric manner. This concentric recording can also be performed by parallel translation of the signal beam by using a reflecting mirror, not shown, as well as by relative shift of the signal beam by parallel translation of the whole mechanism of the support means shown in FIG. 4.

Although in the present embodiment, angle-multiplexed recording and spatial multiplexed recording are performed simultaneously by using the single shift mechanism, it is also possible to use a shift mechanism for causing either the linear motion of the volume holographic memory 10 along the optical crystal axis (i.e. in the directions indicated by the arrow "A") or the rotation of the same (i.e. indicated by the arrow "B"), whereby only one of the multiplexed recordings may be performed.

Figure 5:
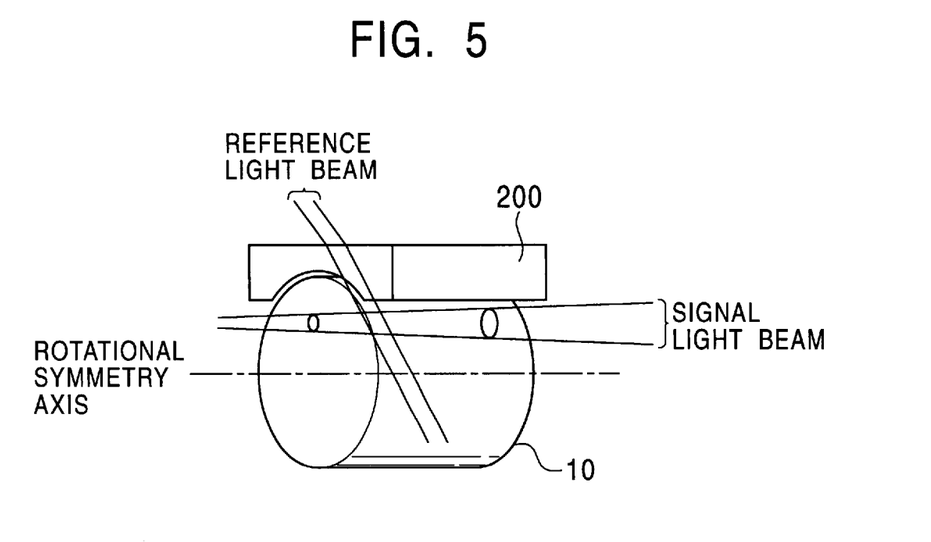
FIG. 5 is an enlarged perspective view schematically showing essential parts of the volume holographic memory system of FIG. 2.

According to the present embodiment, the compensation lens 200 is provided in the optical information recording/reproducing system so as to solve a problem that the volume holographic memory 10 having a cylindrical shape can behave as a cylindrical lens to cause distortion of the reference beam. The compensation lens 200 is arranged such that it serves as a plane beam-receiving surface of the memory 10 to compensate for the lens effect by the cylindrical memory 10 itself. For instance, the compensation lens 200 shown in FIG. 5 is implemented by a cylindrical lens formed of a material having the same refractive index as that of the volume holographic memory 10 to minimize the difference in refractive index between the volume holographic memory 10 and the lens 200 itself. Thus, the lens effect of the cylindrical volume holographic memory 10 is eliminated. Further, the compensation lens 200 is formed, for example, of a material, such as lithium niobate doped with MgO, whose photorefractive sensitivity is low, so as to prevent information recording in the volume holographic memory 10 from being adversely affected. Moreover, the compensation lens 200 has a curved surface opposed to the volume holographic memory 10 and having a curvature generally equal to that of the outer peripheral surface of the volume holographic memory 10. That is, the surface of the compensation lens 200 having a complementary shape to the outer peripheral surface of the volume holographic memory 10 is opposed to the volume holographic memory 10 in loose contact or with a slight gap such that the rotary motion and linear motion of the volume holographic memory 10 is permitted. The compensation lens 200 is designed such that the material and curvature thereof minimize distortion of the optical wave surface of the reference beam within the effective diameter of the reference beam.

Figure 6:
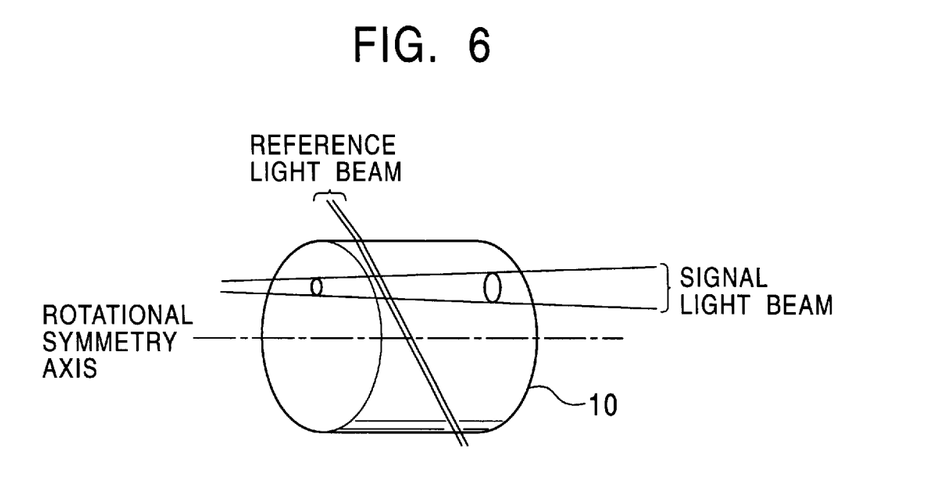
FIG. 6 is another enlarged perspective view schematically showing an essential part of the volume holographic memory system of FIG. 2.
Figure 7:
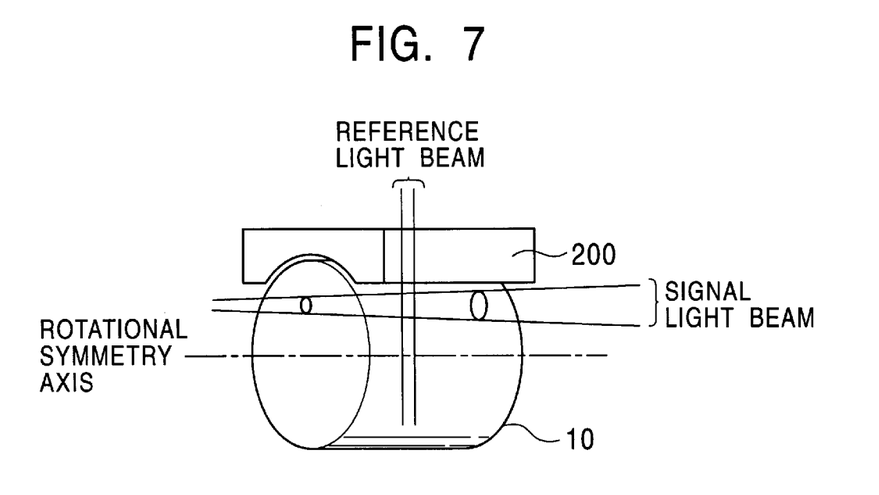
FIG. 7 is still another enlarged perspective view schematically showing essential parts of the volume holographic memory system of FIG. 2.

As described above, the optical information recording/reproducing system includes the compensation lens 200 having the curved surface complementary to the side surface of the volume holographic memory 10, via which the gating beam or the reference beam is admitted, and a plane surface opposite to the curved surface, the complementary curved surface being spaced from the side surface of the volume holographic memory 10 by a predetermined distance. The reference beam and the gating beam do not influence the recording and reproducing performance of the system even if they have their wave surfaces slightly distorted. Therefore, it is only required to cause the two beams to be irradiated on the side surface of the rotary cylindrical form of the volume holographic memory 10 via the single compensation lens 200 described above, without particularly high accuracy. Further, when the curvature of the rotary cylindrical form of the volume holographic memory 10 is much larger than the diameter of the reference beam as shown in FIG. 6, it is possible to apply the reference beam directly to the volume holographic memory 10 without using the compensation lens 200.

Recording sensitivity depends on the relationship between the orientation of interference fringes generated by interference between the signal beam and the reference beam and the direction of the optical crystal axis of the photorefractive crystal. Interference fringes generated, for example, by two plane waves are formed in an angular direction of half of an intersection angle between the two beams. Maximum recording sensitivity can be obtained when the direction of the interference fringes is at an angle of 90 degrees with respect to the direction of the optical crystal axis of the photorefractive crystal. The recording sensitivity decreases as the relationship of these directions deviates from the orthogonal intersection relationship.

For this reason, in the above embodiment, the incidence angle of the reference beam is held constant. However, the incidence angle of the reference beam can be changed by using means for moving the mirror 18 about an axis within its mirror surface (not shown). The recording sensitivity of the crystal can be utilized more effectively by a reference beam diagonally incident on the volume holographic memory 10 than by a reference beam perpendicularly incident on the same. However, if the maximum recording sensitivity of a crystal is high, the perpendicularly incident reference beam does not cause any practical problem. In general, the recording sensitivity decreases according to the COS function, and hence, in the case of the perpendicularly incident reference beam (where the orientation of interference fringes is inclined at 45 degrees with respect to the optical crystal axis), 70% of the recording sensitivity can be obtained.

On the other hand, in reproducing the recorded optical information, the volume holographic memory 10 in which recording is performed as described above is mounted in the hollow cylindrical rotary member 19a similar to the case of recording. Then, the shutter 6a is closed and the gating beam source 30 is turned off by the control of the controller 20, whereby only the reference beam reflected by the mirror 18 is permitted to enter the volume holographic memory 10. In response to the incident reference beam, a diffracted light beam from the interference fringes recorded in the volume holographic memory 10 passes through an inverse Fourier transform lens 21 as a reproduced light beam and enters a CCD 22 where a reproduction image is formed. The CCD 22 has a two-dimensional planar light-receiving surface having a size of e.g. 640 pixels wide by 480 pixels high similar to the spatial light modulator 12 and converts the received reproduced light beam to an electric signal to deliver the same to a decoder 26. The decoder 26 compares the input electric signal with a predetermined slice level and outputs binary digital data.

Thus, the so-called two-color holographic memory system is obtained in which, as described above, the signal beam and the reference beam each having the first wavelength are irradiated on the volume holographic memory, and at the same time the gating beam which has the second wavelength different from the first wavelength, for causing an increase in photosensitivity of the volume holographic memory is applied to the volume holographic memory, whereby interference fringes are recorded at a spot irradiated with the signal beam, the reference beam, and the gating beam.

This two-color holographic memory system makes it possible to eliminate a defect of the conventional so-called unicolor holographic memory system using only one laser having a single wavelength as a beam source for emitting the signal beam and the reference beam, in which recorded information existing in the respective optical paths after recording of interference fringes is erased by the signal beam and the reference beam.

According to the two-color holographic memory system, the signal beam is positioned in parallel with the rotational symmetry axis of the cylindrical form of the volume holographic memory and the reference beam is introduced into the volume holographic memory via the curved surface of a side thereof. This makes it possible to control the position of the interference of the signal beam and the interference beam only by controlling the position of incidence of the reference beam alone, with a fixed incidence angle θ of the same.

In general, the two-color holographic memory system also requires optimal control of entry of the gating beam to increase the multiplicity of the spatial recording. In this connection, however, when the above cylindrical volume holographic memory is employed, it is also only required to control the entry position of the gating beam, and hence it is possible to simplify the construction of the system.

Figure 8:
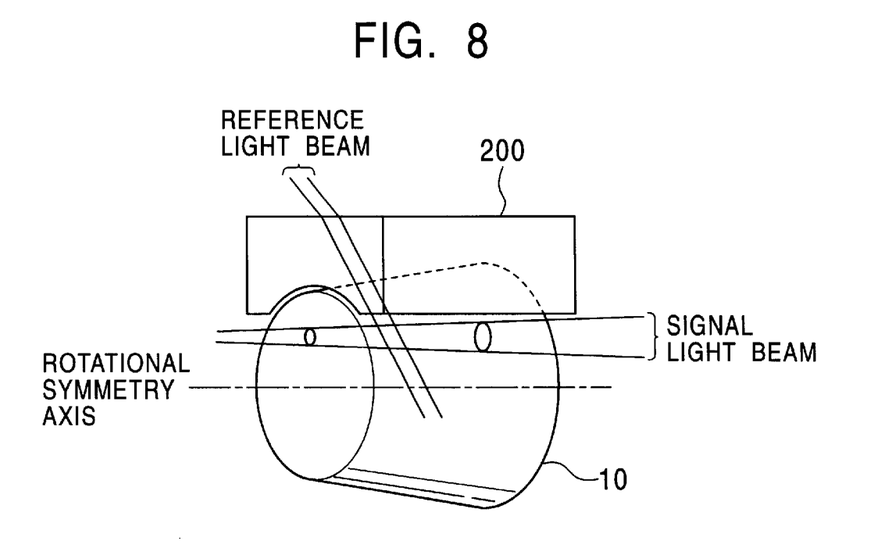
FIG. 8 is an enlarged perspective view schematically showing a holographic memory of a variation of the embodiment.

Although in the above embodiment, the rotary volume holographic memory having a cylindrical shape is described as a preferred example, this is not limitative, but the volume holographic memory may be in the form of a truncated cone as shown in FIG. 8. In this case, the truncated cone-shaped volume holographic memory 10 may be held by a hollow rotary holder having a shape corresponding to that of the volume holographic memory 10. Alternatively, the volume holographic memory may have a substantially cylindrical shape.

What is claimed is:

1. An optical information recording/reproducing system comprising:

a holographic memory shaped into a rotary member having a rotational symmetry axis, the holographic memory comprising two plane surfaces perpendicular to the rotational symmetry axis at respective opposite ends thereof and a curved side surface surrounding the rotational symmetry axis;

a reference beam irradiator that irradiates said holographic memory with a coherent reference beam having a first wavelength;

a signal beam irradiator that irradiates said holographic memory with a coherent signal beam, which has said first wavelength, is modulated according to image data, passes through the two plane surfaces, and intersects with said reference beam within said holographic memory to generate a refractive index grating of a three-dimensional optical interference pattern between said signal beam and said reference beam;

a detector that detects a diffracted light generated by irradiation of said reference beam on said refractive index grating of said optical interference pattern; and a support that removably supports the holographic memory at edges of the plane surfaces and the curved side surface thereof without interrupting the reference beam and signal beam;

wherein said support holds said holographic memory in a position allowing said signal beam to pass through said plane surfaces of said holographic memory at said respective opposite ends thereof.

2. An optical information recording/reproducing system according to claim 1, wherein said support holds said holographic memory in a position where said rotational symmetry axis of said holographic memory is parallel with an optical path of said signal beam.

3. An optical information recording/reproducing system according to claim 1, wherein said reference beam irradiator irradiates said reference beam on the curved side surface of said holographic memory.

4. An optical information recording/reproducing system according to claim 3, wherein said support includes a shifter that shifts said holographic memory along said rotational symmetry axis of said holographic memory.

5. An optical information recording/reproducing system according to claim 3, wherein said support includes a rotator that rotates said holographic memory about said rotational symmetry axis of said holographic memory.

6. An optical information recording/reproducing system according to claim 3, wherein said support comprises:

a shifter that shifts said holographic memory along said rotational symmetry axis of said holographic memory; and a rotator that rotates said holographic memory about said rotational symmetry axis.

7. An optical information recording/reproducing system according to claim 1, further comprising a gating beam irradiator that irradiates said holographic memory with a gating beam having a second wavelength for increasing photosensitivity of said holographic memory and causing one of activating and deactivating said refractive index grating depending on whether said optical interference pattern is present.

8. An optical information recording/reproducing system according to claim 7, wherein said gating beam irradiator irradiates said gating beam on the curved side surface of said holographic memory.

9. An optical information recording/reproducing system according to claim 8, wherein said gating beam irradiator applies said gating beam in a manner restricted to a limited area within said holographic memory, wherein said signal beam and said reference beam intersect with each other.

10. An optical information recording/reproducing system according to claim 1, further comprising a compensation lens having a curved surface complementary to said curved side surface of said holographic memory via which said reference beam and said gating beam enter said holographic memory and a plane surface on a side thereof opposite to said curved side surface, said compensation lens being arranged such that said complementary curved surface is spaced from said curved side surface of said holographic memory by a predetermined distance.

11. A holographic memory that records a three-dimensional distribution of interference fringes generated by interference between a reference beam and a signal beam modulated according to image data, wherein the holographic memory comprises:

a photorefractive uniaxial crystal shaped into a rotary member having a rotational symmetry axis in parallel with an optical crystal axis of said uniaxial crystal;

two plane surfaces perpendicular to said rotational symmetry axis formed at respective opposite ends thereof; and a curved side surface surrounding the rotational symmetry axis.

12. A holographic memory according to claim 11, wherein said shape of a rotary member is cylindrical.

13. A holographic memory according to claim 11, wherein said shape of a rotary member is a truncated cone.

14. An optical information recording system comprising:

a holographic memory shaped into a rotary member having a rotational symmetry axis, the holographic memory comprising two plane surfaces perpendicular to the rotational symmetry axis at respective opposite ends thereof and a curved side surface surrounding the rotational symmetry axis;

a reference beam irradiator that irradiates said holographic memory with a coherent reference beam having a first wavelength;

a signal beam irradiator that irradiates said holographic memory with a coherent signal beam, which has said first wavelength, is modulated according to image data, passes through the two plane surfaces, and intersects with said reference beam within said holographic memory to generate a refractive index grating of a three-dimensional optical interference pattern between said signal beam and said reference beam; and a support that removably supports the holographic memory at edges of the plane surfaces and the curved side surface thereof without interrupting the reference beam and the signal beam, wherein said support holds said holographic memory in a position allowing said signal beam to pass through said plane surfaces of said holographic memory at said respective opposite ends thereof.

15. An optical information system, comprising:

a holographic memory that rotates about a rotational axis, wherein the holographic memory comprises a first plane surface, a second plane surface, and a side surface, wherein the first plane surface and the second plane surface intersect the rotational axis and wherein the side surface is disposed between the first plane surface and the second plane surface; and an optical system that generates a reference beam and a signal beam and supplies the reference beam and signal beam at least indirectly to the holographic memory, wherein the reference beam and signal beam intersect within said holographic memory.

16. The system as claimed in claim 15, wherein the first plane surface and the second plane surface are substantially perpendicular to said rotational axis.

17. The system as claimed in claim 16, wherein the side surface is a curved surface that at least partially surrounds said rotational axis.

18. The system as claimed in claim 17, wherein said signal beam passes through said first plane surface and said second plane surface.

19. The system as claimed in claim 15, wherein the side surface is a curved surface that at least partially surrounds said rotational axis.

20. The system as claimed in claim 15, wherein said signal beam passes through at least one of said first plane surface and said second plane surface.

21. The system as claimed in claim 20, wherein said signal beam passes through said first plane surface and said second plane surface.

* * * * *